United States Patent [19]
Eron

[11] 3,790,395
[45] Feb. 5, 1974

[54] FOAMED COVER COMPOSITION
[76] Inventor: Robert E. Eron, 3375, 34th St. N., St. Petersburg, Fla. 33713
[22] Filed: Nov. 1, 1971
[21] Appl. No.: 194,523

[52] U.S. Cl............................ 106/122, 47/2, 47/9, 47/DIG. 6
[51] Int. Cl. ...................... C08b 25/00, C08b 27/02
[58] Field of Search .......... 106/122; 47/2, 9, DIG. 6

[56] References Cited
UNITED STATES PATENTS
2,875,555    3/1959    Thiegs et al. ............................ 47/9
3,067,542   12/1962    O'Brien..................................... 47/9
3,017,720    1/1962    Busch ....................................... 47/9
3,480,018   11/1969    Fairchild......................... 131/140 C Primary Examiner—Allan Lieberman
Attorney, Agent, or Firm—Stefan M. Stein

[57] ABSTRACT

A foamed cover composition made by blending and emitting, from a foam generator, a foamed composition comprising a thickener, a cationic surfactant, a waste filler, and if desired, an additive to effect desired sustained release or sustained acting characteristics.

6 Claims, No Drawings

FOAMED COVER COMPOSITION

BACKGROUND OF THE INVENTION

1. Field of the Invention

This invention relates to a foamed cover composition and more particularly to a composition which, after being fed through a foam generator of the type such as disclosed in copending application, Ser. No. 771,704, filed Oct. 30, 1968, and spread on a surface, effects a stable foamed cover composition over said surface. Dependent upon the particular fillers and additives utilized therein, unique sustained releasing or sustaining acting abilities may also be imparted thereto.

2. Description of the Prior Art

In many techniques, there is a need for a cover composition which is inexpensive, protective, porous and, dependent upon the technology, of prolonged life, yet eventually self-disintegrating, or stable, or rigid, or decorative, or sound absorptive, or similar additional attributes. For example, in highway construction, straw or hay has been utilized to protect shoulders and slopes adjacent thereto until there is growth of the planted grass seed. The straw or hay prevents erosion of the shoulders and adjacent slopes by wind and rain, and retains ambient moisture, yet eventually decomposes and actually acts as a compost for aiding in growth of the planted grass seed. In roof construction, gravel is spread over the sheet roofing and tar to thereafter protect them against the deleterious ultra violet rays of the sun. In weed control, various mulching matter such as bark, pine needles, and shredded wood is spread between plants to discourage the growth of weeds and also to retain moisture around the roots of the plants. In sewage treatment, the solid matter is filtered and deodorized, then dried and pulverized for sale as organic fertilizer which is spread around plants to aid in their growth.

SUMMARY OF THE INVENTION

Objectives

An object of this invention is to provide an unique cover composition.

Another object is to provide a cover composition which has a foam structure of light weight.

Still another object is to provide a cover composition which has a fibrous structure of surprising strength.

A further object is to provide a cover composition which utilizes inexpensive and frequently waste material as filler.

A still further object is to provide a cover composition to which ingredients may be added to achieve unique and prolonged relapse or prolonged acting characteristics.

Another object is to provide a cover composition which may act as a protective coat for a predetermined period of time.

Another object is to provide a cover composition which may be applied at a distance from the surface to be covered.

Another object is to provide a cover composition which may be designed to eventually deteriorate or degrade into a beneficial agent either to the surface being covered or to adjacent or undersurface objects.

Another object is to provide a cover composition which is self-adherent to the surface being covered.

Another object is to provide a cover composition which may be possed through a foam generator.

Other objects of the invention will in part be obvious and will in part appear hereinafter.

BROAD STATEMENT OF INVENTION

It has now been found that a unique cover composition can be synthesized by first dissolving a thickener, such as an anionic heteropolysaccharide produced by the fermentation of a carbohydrate by the bacterium xanthomonas campestris, in a solvent, such as ethyl or propyl alchol. Then a slurry of a cationic quanternary ammonium compound, such as a dialkyl phenyl trimethyl ammonium chloride, is made and the thickener solution and the cationic slurry are blended in a foam generator, such as the generator described in copending patent application, Ser. No. 771,704, filed Oct. 30, 1968, along with a filler and if desired, an additive, to effect certain characteristics, as will be illustrated hereinafter. The stream of foam emitted from the generator is then directed to the surface to be covered for a foam spray application. The final product on collapse becomes a webbed, lightweight dry blanket or porous "web cake."

The thickener concentration in the emitted foam should be 0.005 to 20 percent by weight.

The cationic may comprises dimethyl dihydrogenated tallow quaternary, stearyl dimethyl benzyl ammonium chloride, alkyl methylisoquinolinium chloride, cetyl dimethyl ethyl ammonium bromide, cetyl dimethyl benzyl ammonium chloride, cetyl trimethyl ammonium bromide, n-alkyl trimethyl ammonium chloride, di-coco dimethyl ammonium chloride, di-stearyl dimethyl ammonium chloride, N-cetyl-N-ethyl morpholinum ethosulfate (35 percent aqueous solution), alkyldimethylbenzylammonium chloride, alkyldimethylethylbenzyl ammonium chloride, dimethyl benzyl lauryl ammonium chloride, di-isobutyl cresoxy ethoxy ethyl dimethyl benzyl ammonium chloride, di-isobutyl phenoxy ethoxy ethyl dimethyl benzyl ammonium chloride, methyl dodecyl benzyl trimethyl ammonium chloride and methyl dodecyl xylene bis(trimethyl ammonium chloride) N-alkyl($C_{12}$, $C_{14}$, $C_{16}$) dimethyl benzyl ammonium chloride, alkyl dimethyl dichloro benzyl ammonium chloride, alkyl isoquinolinium bromide, alkenyl dimethyl ethyl ammonium bromide, alkyl dimethyl hydroxyethyl ammonium bromide, stearyl quaternary ammonium compound, fatty glyoxalidinium chloride, coco fatty dialkyl benzyl ammonium chloride. The concentration in the emitted foam may range from about 0.5 to 5 percent by weight.

With respect to the filler, it may comprise a clay phosphate slime, coal dust, precipitated smoke stack effluent, fly ash, industrial and mining effluents, slaughterhouse effluent, solids from sewage treatment plants, animal and bird manure, pulverized garbage, mulch, muck, peat, filter mud, chopped weeds or grass or straw or bagasse or stalks or weeds or brush. The concentration of the filler may range from 10 to 50 percent by weight.

With respect to the "additives" that may be added, these may comprise cement, epoxy resin, gel forming agents, insecticides, herbicides, deliquescent agents, hygroscopic agents, and neutralizers.

The concentration of these may range from 0.5 to 10 percent by weight.

The invention accordingly comprises the several steps and the relation of one or more of such steps with respect to each of the others, and the composition possessing the features, properties, and the relation of components, which are exemplified in the following detailed disclosure and the scope of the invention will be indicated in the claims.

DETAILED DESCRIPTION

For a fuller understanding of the nature and objects of the invention, reference should be had to the following detailed examples:

EXAMPLE I 0.05 parts by weight of a thickening agent, in this instance, an anionic heteropolysaccharide produced by the fermentation of a carbohydrate by the bacterium, xanthomonas campestris, (such as Biopolymer XB-23 manufactured by General Mills, Minneapolis, Minnesota) are dissolved in 10 parts by weight of ethyl alchol.

0.5 parts by weight of a quaternary cationic compound, in this instance, a mixture of methyl dodecyl benzyl trimethyl ammonium chloride and methyl dodecyl xylylene bis-trimethyl ammonium chloride (Hyamine 2389 manufactured by Rohn & Haas, Philadelphia, Pennsylvania) are slurried in 10 parts by weight of water.

The above polysaccharide alcohol solution and the aqueous cationic slurry are then fed to a foam generator of the type described in copending patent application Ser. No. 771,704, filed Oct. 30, 1968, along with 100 parts by weight of a 30 percent by weight slurry of phosphate slime from a phosphate mining operation. The resultant foam is applied via the nozzle of the generator to a grass seeded slope troubled by erosion during rain. The slope is observed and even during a heavy pounding rain, there is substantially no erosion. The composition applied, after drying, has a fibrous foam structure which resembles cellulose sponge. It absorbs and retains some of the rain. The grass seed planted under said cover composition eventually emerges through the fibrous foam-like structure and the grass seedling seem to thrive on the cover composition. In time, the composition seems to degrade in favor of the matured grass.

EXAMPLE II 1.0 parts by weight of a thickener, in this instance, an anionic heteropolysaccharide produced by the fermentation of a carbohydrate by the bacterium, xanthomonas campestris, are dissolved in 10 parts by weight of alcohol.

2.0 parts by weight of distearyl dimethyl ammonium chloride (Arquad 2HT manufactured by Armour and Company, Chicago, Illinois) are slurried in 10 parts of weight water.

the alcohol solution and the slurry are blended together and fed to a foam generator along with 100 parts by weight of a 10 percent by weight slurry of chicken manure-earth. The resultant foam is applied to a bed of roses. No odor will be detected for the foam structure apparently deodorizes the manure. The rose plants are not harmed as would be expected with such strong manure as chicken manure. Instead, the plants seem to provide an overabundance of roses thereafter. Also the foam when dried, acts as a mulch and helps to stem weed growth, retain moisture and control temperatures.

EXAMPLE III 2.0 parts by weight of a thickener, in this instance, an anionic heteropolysaccharide produced by the fermentation of a carbohydrate by the bacterium, xanthomonas campestris, are dissolved in 10 parts by weight acetone.

3.0 parts by weight of fatty glyoxalidinium chloride (Quatrene C-56 manufactured by Textilana Corporation, Hawthorne, California) are slurried in 10 parts by weight water.

The alcohol solution and the slurry are blended together and fed to a foam generator along with 100 parts by weight of a 5 percent by weight slurry of solids from a sewage treatment plant. The resultant foam emitted from the generator is spread over a field of soybean plants. The foam eventually dries to a thick gel-like cover around each plant. Weed growth seems to be discouraged and the soybean plants grow as if they has been fertilized with organic nitrogen fertilizer.

It should be evident from the above that a unique cover composition has now been devised.

It will thus be seen that the objects set forth above, among those made apparent from the preceding description, are efficiently attained and, since certain changes may be made in carrying out the above method and in the compounds set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A foamed cover composition comprising a solution of thickener consisting of 0.005 to 20 percent by weight in the emitted form of Biopolymer XB-23 produced by the fermentation of a carbohydrate by the bacterium *Xanthomonas campestris*, a slurry of 0.5 to 5.0 percent of a cationic surfactant selected from the group consisting of dimethyl dihydrogenated tallow quaternary, stearyl dimethyl benzyl ammonium chloride, alkyl methylisoquinolinium chloride, cetyl dimethyl ethyl ammonium bromide, cetyl dimethyl benzyl ammonium chloride, cetyl trimethyl ammonium bromide, n-alkyl trimethyl ammonium chloride, di-coco dimethyl ammonium chloride, di-stearyl dimethyl ammonium chloride, N-cetyl-N-ethyl morpholinum ethosulfate (35 percent aqueous solution), alkyldimethylbenzylammonium chloride, alkyldimethylethylbenzyl ammonium chloride, dimethyl benzyl lauryl ammonium chloride, di-isobutyl cresoxy ethoxy ethyl dimethyl benzyl ammonium chloride, di-isobutyl phenoxy ethoxy ethyl dimethyl benzyl ammonium chloride, methyl dodecyl benzyl trimethyl ammonium chloride and methyl dodecyl xylene bis(trimethyl ammonium chloride) N-alkyl ($C_{12}$, $C_{14}$, $C_{16}$) dimethyl benzyl ammonium chloride, alkyl dimethyl dichloro benzyl ammonium chloride, alkyl isoquinolinium bromide, alkenyl dimethyl ethyl ammonium bromide, alkyl dimethyl hydroxyethyl ammonium bromide, stearyl quaternary ammonium compound, fatty glyoxalidinium chloride, coco fatty dialkyl benzyl ammonium chloride, and 10 to 50 percent of a waste filler consisting of a member of the class consisting of clay, phosphate slime, coal dust, preciptated smoke stack effluent, fly ash, industrial and mining effluents, slaughterhouse effluent, solids from sewage treatment plants, animal and bird manure, pulverized garbage, mulch, muck, peat, filter mud, chopped weeds or grass or straw or bagasse or stalks or weeds or brush: blended, foamed and emitted from a foam generator before application as a cover.

2. The foamed cover composition of claim 1 wherein said cationic consists of 0.5 to 5.0 percent by weight in its emitted form of a mixture of methyl dodecyl benzyl trimethyl ammonium chloride and methyl dodecyl xylylene bistrimethyl ammonium chloride.

3. The foamed cover composition of claim 1 wherein said thickener consists of 0.005 to 2.0 percent by weight in its emitted form of Biopolymer XB-23 produced by the fermentation of a carbohydrate by the bacterium *Xanthomonas campestris* and said cationic consists of 0.5 to 5.0 percent by weight in its emitted form of a mixture of methyl dodecyl benzyl trimethyl ammonium chloride and methyl dodecyl xylylene bistrimethyl ammonium chloride, and said filler comprises 10 to 50 percent by weight of clay in its emitted form.

4. The foamed cover composition of claim 1 wherein said thickener consists of 0.005 to 2.0 percent by weight in its emitted form of Biopolymer XB-23 produced by the fermentation of a carbohydrate by the bacterium *Xanthomonas campestris* and said cationic consists of 0.5 to 5.0 percent by weight in its emitted form of a mixture of methyl dodecyl benzyl trimethyl ammonium chloride and methyl dodecyl xylylene bistrimethyl ammonium chloride, and said filler comprises 10 to 50 percent by weight phosphate slime in its emitted form.

5. The foamed cover composition of claim 1 wherein said thickener consists of 0.005 to 2.0 percent by weight in its emitted form of Biopolymer XB-23 produced by the fermentation of a carbohydrate by the bacterium *Xanthomonas campestris* and said cationic consists of 0.5 to 5.0 percent by weight in its emitted form of a mixture of methyl dodecyl benzyl trimethyl ammonium chloride and methyl dodecyl xylylene bistrimethyl ammonium chloride, and said filler comprises 10 to 50 percent by weight of solids from sewage treatment plants.

6. The foamed cover composition of claim 1 wherein said thickener consists of 0.005 to 2.0 percent by weight in its emitted form of Biopolymer XB-23 produced by the fermentation of a carbohydrate by the bacterium *Xanthomonas campestris* and said cationic consists of 0.5 to 5.0 percent by weight in its emitted form of a mixture of methyl dodecyl benzyl trimethyl ammonium chloride and methyl dodecyl xylylene bistrimethyl ammonium chloride, and said filter comprises 10 to 50% by weight pulverized garbage in its emitted form.

* * * * *

UNITED STATES PATENT OFFICE
CERTIFICATE OF CORRECTION

Patent No. 3,790,395      Dated February 5, 1974

Inventor(s) Robert E. Eron

It is certified that error appears in the above-identified patent and that said Letters Patent are hereby corrected as shown below:

Column 2, line 11, "xanthomonas campestris" should read -- Xanthomonas campestris --. Column 3, line 18, "xanthomonas campestris" should read -- Xanthomonas campestris --; lines 52-53, "xanthomonas campestris" should read -- Xanthomonas campestris --; lines 56-57, "of weight water" should read -- by weight of water --. Column 4, lines 7-8, "xanthomonas campestris" should read -- Xanthomonas campestris --.

Signed and sealed this 1st day of October 1974.

(SEAL)
Attest:

McCOY M. GIBSON JR.
Attesting Officer

C. MARSHALL DANN
Commissioner of Patents